Aug. 21, 1951 — R. A. SCHULTZ — 2,565,000
PORTABLE STOVE
Filed June 24, 1948 — 2 Sheets-Sheet 1

Rudolph A. Schultz
INVENTOR.

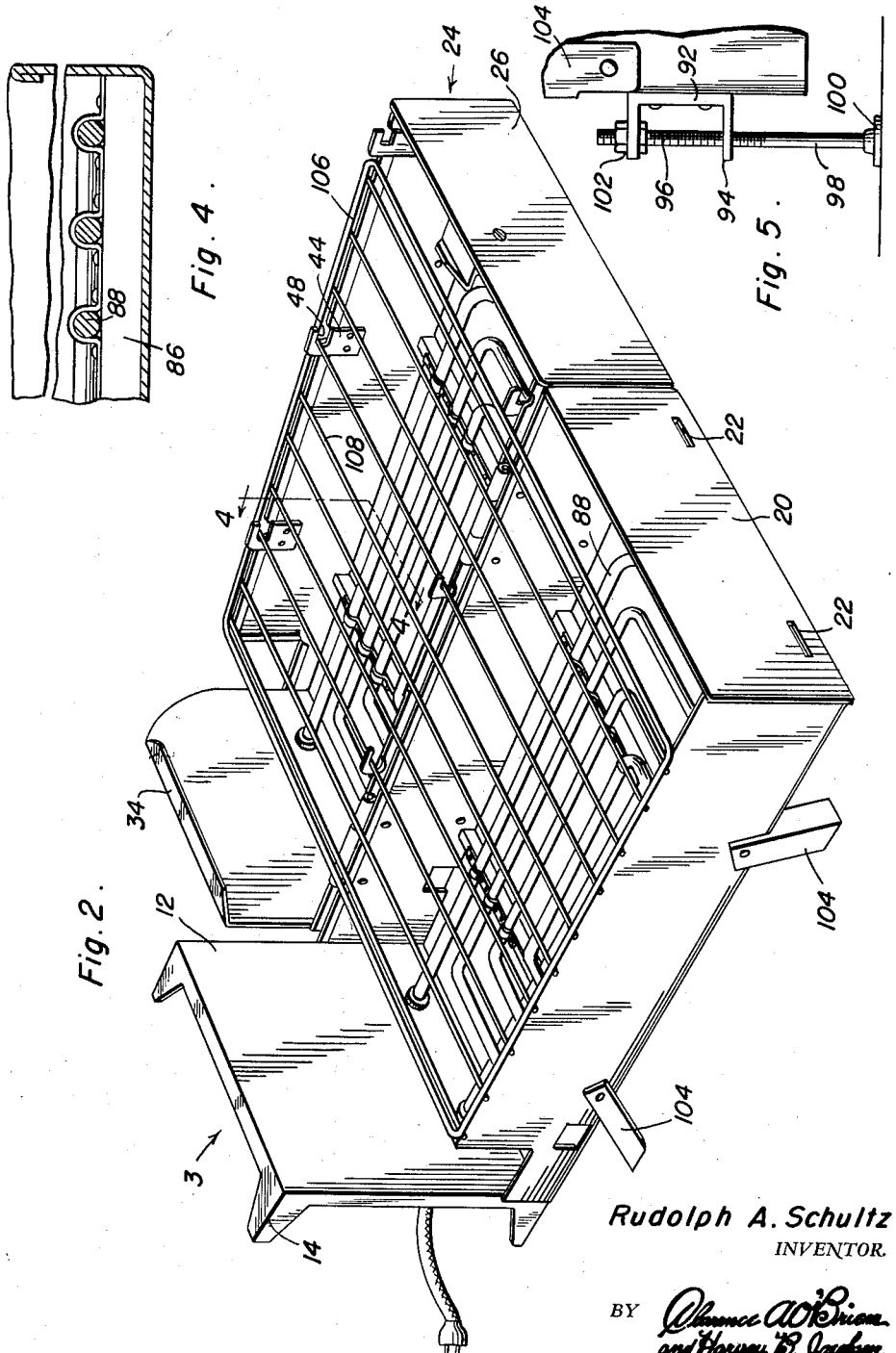

Patented Aug. 21, 1951

2,565,000

UNITED STATES PATENT OFFICE 2,565,000

PORTABLE STOVE

Rudolph A. Schultz, Hagerstown, Md.

Application June 24, 1948, Serial No. 35,031

8 Claims. (Cl. 126—9)

This invention relates to new and useful improvements in stoves and the primary object of the present invention is to provide a novel and improved heating compartment having a removable end section that supports a group of slidable drawers and are so positioned relatively to the heating compartment that the heat from the said heating compartment will properly heat and retain foodstuff in the drawers in a warm and desirable state.

Another important object of the present invention is to provide a portable stove including a main casing having a hinged closure that will support racks of food, an end section or auxiliary casing removably carried by the main casing, said auxiliary casing being removed to facilitate the employement of the main casing as a heating unit on which a grill is disposed.

A further object of the invention is to provide a portable stove with parts thereof which are quickly and readily removed or assembled to facilitate the convenient storage, shipment or carrying of the same, and which is so constructed as to facilitate the parts to be quickly and readily cleaned in a desirable manner.

A still further aim of the present invention is to provide a portable stove that is simple and practical in construction, strong and reliable in use, neat and attractive in appearance, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a perspective view showing the main casing in an open position for use of the same in supporting a grill, the auxiliary casing removed therefrom;

Figure 4 is a fragmentary longitudinal sectional view taken substantially on the plane of section line 4—4 of Figure 2; and, Figure 5 is a fragmentary, rear elevational view of the auxiliary casing, and illustrating the means associated therewith for supporting the same in an elevated position.

Figure 1:
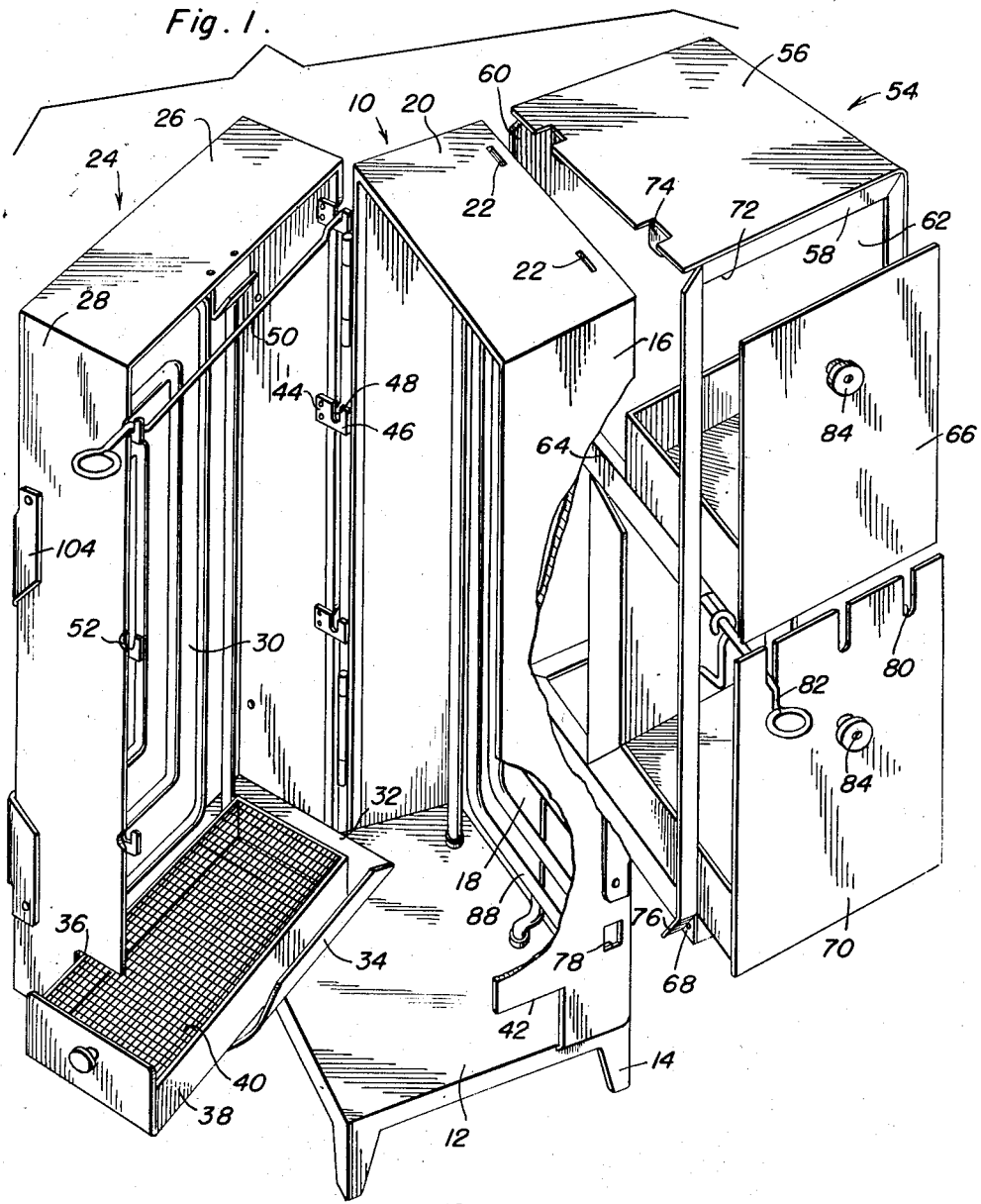
Figure 1 is a group perspective view of the present invention, showing the hinged closure for the main casing in an open position, the auxiliary casing spaced relative to the main casing, and parts of the main casing broken away and shown in section for the convenience of explanation.
Figure 3:
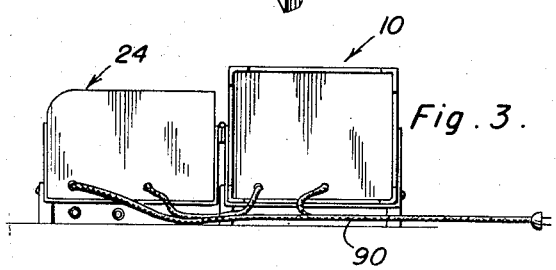
Figure 3 is an end view of the present portable stove taken substantially in the direction of arrow number 3 in Figure 2.

Referring now to the drawings in detail, wherein for the purpose of illustration, there is disclosed a preferred embodiment of the present invention, the numeral 10 represents the main casing or heating compartment generally, having a base or bottom wall 12 that is supported in an elevated position by feet or legs 14 which are integrally formed therewith.

Fixed to the base or bottom wall 12, is a pair of spaced parallel side walls 16 and an end wall or rear wall 18. The upper edges of the walls 16 and 18 are connected by an upper wall 20 that is formed with spaced slots or openings 22 for a purpose which will later be more fully apparent.

The main casing 10 includes a hinged cover, door or closure 24 that is provided with an upper wall 26, spaced side walls 28, a forward or end wall 30 and a bottom wall 32 the free edge of which is turned upwardly to provide a retaining flange 34.

Slidably engaging the bottom wall 32 and movable through a notch or opening 36 provided in one side wall of the closure 24, is a drawer or tray 38 that supports a screen element 40.

In order to accommodate the tray 38, a further notch 42 is provided in one side wall 16 of the main casing 10 whereby the closure 24 may be applied in its normal position against the main casing 10.

Fixed to the inner faces of the side walls 28, is a plurality of vertically spaced or longitudinally displaced arms 44 the projecting ends or terminals 46 of which are provided with arcuate notches or recesses 48 that engage the end portions of a plurality of spaced article holding racks or bars 50. It is preferred that the free longitudinal edges of the side walls 28 be provided with notches 52 that communicate with the notches or recesses 48 so that the said rods 50 will not move or slip relative to the holding arms 44. These holding arms 44 have a further function which will presently be described.

The numeral 54 represents an end section, compartment or auxiliary casing that includes an upper wall 56, a side wall 58, a further side wall 60 and an end wall 62. Fixed between the walls 60 and 58, is a pair of guides 64 that support an upper drawer 66, and a further pair of guides 68 that slidably support a lower drawer 70. It being understood that a substantially rectangular opening 72 is provided in the wall 58 to accommodate or receive the said drawers 66 and 70.

Struck downwardly from the upper wall 56 of the auxiliary casing 54, is a plurality of tongues 74 that will engage the slots or openings 22 provided in the upper wall 20 of the main casing 10, thus retaining the auxiliary casing supported relative to the main casing. To further retain the auxiliary casing supported relative to the main casing 10, the lower terminal 76 of the front wall 58 is notched and turned inwardly to provide an inclined extension that will slidably engage a suitable aperture or opening 78 formed in one side wall of the main casing.

The outer wall of the drawer 70 is preferably formed with vertical slots 80, and the rear wall or inner wall of the said drawer 70 is likewise provided with slots (not shown) whereby holding rods or supporting bars 82 will be retained relative to the drawer 70 and spaced above the bottom walls of the drawers 70.

Any suitable handle or hand gripping means 94 are applied to the outer walls of the drawers 66 and 70 to permit the same to be moved into and out of position within the auxiliary casing 54.

Fixed on spaced parallel insulated blocks 86 fixed to the end walls 18 and 30 of the casings 10 and 24, is a plurality of coils 88 which are connected to a suitable source of electric current by a conductive wire or pair of wires 90.

Rigidly secured to preferably one side wall 60 of the auxiliary casing 54, is a U-shaped support 92 the leg portions 94 of which are formed with eyes or apertures that slidably engage the externally threaded shank portion 96 of a supporting rod or bar 98 having a pressure foot or plate 100 at its lower extremity. Pairs of lock nuts 102 receivably engage the shank portion 96 and one leg portion of the support 92 for retaining the said bar 98 in a selected adjusted position relative to the casing 54. Since the weight of the material in the drawers 66 and 70 will tend to tilt the said casing 54 in one direction, it is desirable to have such a supporting means which may be adjusted for supporting the said auxiliary casing in a substantially vertical position. This support means, best shown in Figure 5 of the drawings, is also applied to the hinge closure 24 to prevent tipping action thereof when the same is an open position.

Pivoted to the side walls 16 and 28 of the casing 10 and closure 24, is a plurality of angle members 104 that normally engage the side walls and end walls of the said casing 10 and closure 24.

In practical use of the present invention, articles such as rolls, buns or the like are inserted in the drawers 66 and 70 with the said auxiliary casing 54 applied in position to the main casing 10. The heat from the coils 88 will be such as to heat both the main casing 10 and the auxiliary casing 54, thus retaining the foodstuff in the drawers 66 and 70 in a warm and fresh state.

When it is desirable to employ the present stove without the auxiliary casing 54, or for supporting a grill 106, the legs or angle members 104 are pivoted outwardly and engage a supporting surface as shown best in Figure 2 of the drawings.

Selected cross rails 108 of the grill 106 engage the notches 48 to prevent movement of the said grill relative to the closure 24 and the main casing 10.

Having described the invention, what is claimed as new is:

1. A portable stove comprising a main casing having a hinged closure and an outer portion including a heat exchanging wall, an auxiliary casing having an opening receiving the outer portion of said main casing including said heat exchanging wall, means removably securing said auxiliary casing relative to said main casing, a plurality of slidable drawers carried by said auxiliary casing, an adjustable support carried by said auxiliary casing and preventing sagging of said auxiliary casing relative to said main casing, a first heating unit mounted in said main casing in juxtaposition with said heat exchanging wall, and a second heating unit mounted in and supported solely by said closure.

2. A portable stove comprising a main casing having a hinged closure and a heat exchanging wall, said closure having a bottom wall, a tray slidably supported on the bottom wall of said closure, an auxiliary casing, means removably securing said auxiliary casing to said main casing, a heating unit disposed in said main casing in juxtaposition with said heat exchanging wall, and a further heating unit mounted in said closure, said auxiliary casing including an upper wall and spaced side walls, said auxiliary casing having an opening between said side walls receiving said heat exchanging wall therein, said main casing including a pair of side walls and an upper wall, the upper wall and side walls of said auxiliary casing overlying the end wall and the side walls of said main casing.

3. A portable stove comprising a main casing having a bottom wall, a pair of spaced side walls, a heat transferring end wall and an upper wall, a closure including spaced side walls, a forward wall, an upper wall and a bottom wall, means hinging one side wall of said closure to one side wall of said main casing, the bottom wall of said closure being disposed above the bottom wall of said main casing, an auxiliary casing having an upper wall overlying the upper wall of said main casing, tongues struck downwardly from the upper wall of said auxiliary casing, slots provided in the upper wall of said main casing receiving said tongues, and a heating unit disposed in said main casing, said auxiliary casing having an opening therein receiving the end wall of said main casing for transferring heat from the main casing to the auxiliary casing.

4. The combination of claim 3 and supporting arms fixed to the inner faces of the side walls of said closure for bearing against the inner surfaces of the side walls of said main casing to retain the side walls of the closure flush with the side walls of the main casing when the closure is moved to its closed position relative to the main casing, said arms having notches for receiving article holding rods.

5. The combination of claim 3 and support means carried by said auxiliary casing and preventing sagging of said auxiliary casing with respect to the main casing.

6. The combination of claim 5 wherein said support means includes an adjustable rod, and a bearing element carried by said rod.

7. The combination of claim 3 and an inclined extension on one side wall of said auxiliary casing, one side wall of said main casing having an opening receiving said inclined extension to restrict lateral movement of said auxiliary casing relative to said main casing.

8. A portable stove comprising a main casing having a bottom wall, a pair of spaced side walls, a heat transferring end wall and an upper wall, a closure including spaced side walls, a forward wall, an upper wall and a bottom wall, means hinging one side wall of said closure to one side wall of said main casing, the bottom wall of said closure being disposed above the bottom wall of said main casing, a tray slidably supported on the bottom wall of said closure, an auxiliary casing having an upper wall overlying the upper wall of said main casing, tongues struck downwardly from the upper wall of said auxiliary casing, slots provided in the upper wall of said main casing receiving said tongues, a downwardly and inwardly inclined extension on one side wall of said auxiliary casing, one side wall of said main casing having an opening receiving said extension, a heating unit disposed in said main casing, a further heating unit disposed in said closure, and an adjustable support carried by said auxiliary casing and preventing sagging of the auxiliary casing relative to the main casing.

RUDOLPH A. SCHULTZ.

REFERENCES CITED

The following references are of record in the file of this patent:

UNITED STATES PATENTS

| Number | Name | Date |
|---|---|---|
| 44,175 | Foote | Sept. 13, 1864 |
| 83,458 | Card | Oct. 27, 1868 |
| 175,050 | Dejey | Mar. 21, 1876 |
| 207,286 | Killin | Aug. 20, 1878 |
| 560,445 | Tomkins | May 19, 1896 |
| 706,502 | VanWid | Aug. 5, 1902 |
| 820,847 | Cole | May 15, 1906 |
| 1,871,290 | Wright | Aug. 9, 1932 |
| 1,879,880 | Lindsey | Sept. 27, 1932 |
| 1,991,135 | Brown | Feb. 12, 1935 |